W. E. SEPPMAN.
KNEE THROTTLE GEAR.
APPLICATION FILED NOV. 7, 1917.
1,276,423.
Patented Aug. 20, 1918.
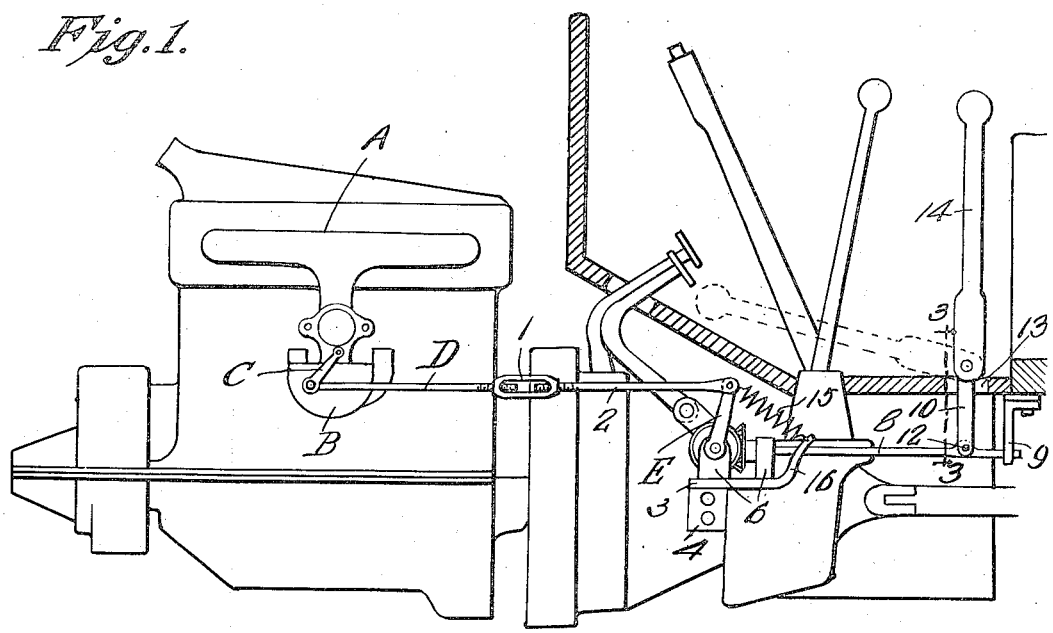
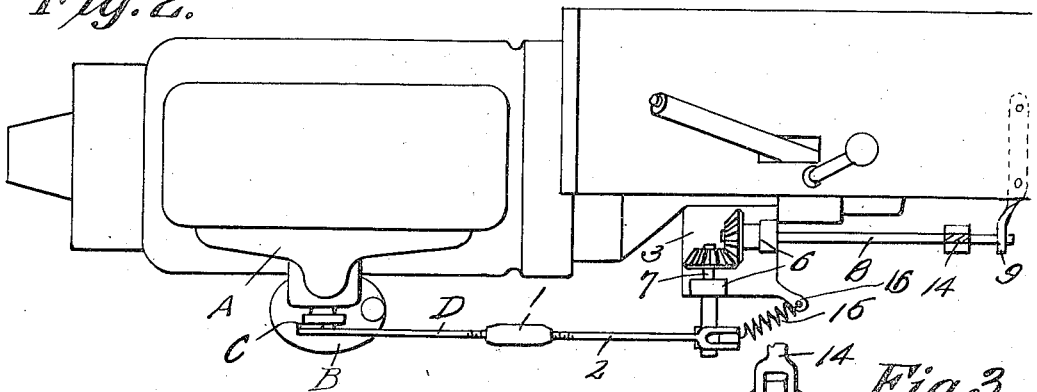
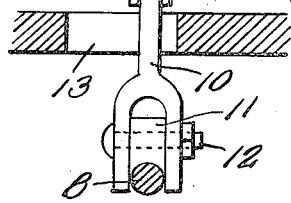
WITNESSES
James F. Crown
Wm H Mulligan
INVENTOR
William E. Seppman,
By Richard B. Owen,
ATTORNEY

UNITED STATES PATENT OFFICE.

WILLIAM E. SEPPMAN, OF LAKE CRYSTAL, MINNESOTA.

KNEE THROTTLE-GEAR.

1,276,423.  Specification of Letters Patent.  Patented Aug. 20, 1918.

Application filed November 7, 1917.  Serial No. 200,804.

*To all whom it may concern:*

Be it known that I, WILLIAM E. SEPPMAN, a citizen of the United States, residing at Lake Crystal, in the county of Blue Earth and State of Minnesota, have invented certain new and useful Improvements in Knee Throttle-Gear, of which the following is a specification.

This invention relates to an attachment for automobile motors and more particularly to a device for permitting the operator of the automobile to operate the throttle of the carbureter by a movement of one of his knees thus permitting both feet to be retained on the foot pedal.

One of the principal objects of the invention is to provide a lever extending upwardly from the floor to a position where it may be engaged by the operator's leg or knee and mounted in a manner to permit it to swing when a pressure is applied by moving or swinging of the leg or knee.

A further object of the invention is to provide a device of this character that may be operated to apply the necessary movement to the throttle mechanism of the carbureter by a simple pressure properly applied to secure the desired throttling of the carbureter in the same manner heretofore accomplished by the use of a foot plate or pedal.

A further object of the invention is the provision of a knee throttle gear which consists of comparatively few parts and is simple in construction, but durable and well adapted to withstand the rough usage to which devices of this character are ordinarily subjected.

For a full description of the invention and the advantages and merits thereof, reference is to be had to the following description and the accompanying drawings wherein is illustrated the preferred form of my invention, in which:—

Figure 1 is a fragmentary side elevation of an automobile motor showing my invention applied thereto.

Fig. 2 is a fragmentary top plan view partly broken away to disclose the operating mechanism.

Fig. 3 is a perspective view of a detail of the invention.

Fig. 4 is an enlarged fragmentary section taken on the line 3—3 of Fig. 1.

Referring to the drawing wherein is illustrated the preferred form of my invention, in which like numerals of reference indicate corresponding parts throughout the several views, the automobile motor A is provided with the usual carbureter B which has the throttle lever C attached thereto. A connecting rod D is attached to the throttle lever C and, through the medium of a turn buckle 1 this rod D is connected to an extension connecting rod 2. Suitably mounted upon the motor is a supporting bracket 3 shown in detail in Fig. 4 of the drawing and the same includes an attaching flange 4 having openings 5 for the reception of bolts or fastening screws whereby the bracket may be attached to a convenient point on the motor. Upstanding ears or lugs 6 are provided on the top of the bracket plate and these lugs are provided with openings which form bearings for the shafts 7 and 8. The shaft 7 is extended through the bearing and has its outer end provided with a link E connected to the rod 2. The inner end of the shaft 7 carries a bevel pinion in mesh with a similar pinion on the end with the shaft 8 which shaft is extended through the other bearing and rearwardly to a point beneath the front seat of the automobile. This rear end of the shaft 8 is supported by a suitable bracket 9 whereby the shaft may be rotated when desired.

Attached to the shaft is a bifurcated arm which forms a yoke 10. The connection of the yoke with the shaft 8 is established through the medium of an enlarged portion or ear 11 through which a bolt 12 is extended, the bifurcated portion of yoke having openings to receive the bolt. The end of the yoke is projected through a slot 13 in the floor of the automobile and the upper extended end is connected to an operating lever 14 which may be engaged by the leg or knee of the operator when it is desired to operate the device. The pivotal connection of the lever 14 with the yoke is such as to permit the lever to swing forwardly as shown by dotted lines in Fig. 1 whereby the lever may be out of the way when not in use. When the automobile is in operation, however, this lever is disposed in vertical position and is in position to be conveniently engaged by the right leg or knee of the person operating the vehicle. When a pressure is applied to the lever the yoke 10 is swung thus causing the shaft 8 to rotate for a sufficient distance to impart a turning movement to the gears which will operate the shaft 7 to cause the link E to exert a pull on the rod D and which in turn, will properly actuate the throttle mechanism.

In order that the mechanism may be brought back to normal condition when pressure on the lever is released, I have provided a coil tension spring 15 connected to the upper end of the link E and to an arm 16 projecting from one corner of the bracket plate 3.

With this device it will be obvious that the ordinary foot pedal which is generally employed for the throttle operation is dispensed with and the operator is free to retain both feet on the brake and clutch pedal while one arm operates the usual lever the other hand being retained on the steering wheel. It will be obvious that the knee or leg of the operator may be easily swung from side to side even while the feet are retained on the pedal.

From the foregoing it will be observed that a very simple and durable knee throttle gear has been provided the details of which embody the preferred form. I desire it to be understood, however, that slight changes in the minor details of construction may be made without departing from the spirit of the invention or the scope of the claims hereunto appended.

I claim:

1. In a knee throttle gear, the combination of an automobile motor having a throttle lever, a swinging operating lever extending through the floor of the automobile, the said throttle lever including a yoke, an operating shaft engaged with the said yoke and adapted to rotate when the operating lever is swung, a second shaft, a bracket mounted on the said motor for supporting the said shaft, means connecting the ends of the shaft to impart movement to one when the other is rotated, and means connecting the said shaft with the said throttle gear to exert a pull on the latter when the said shafts are rotated.

2. In a knee throttle gear, the combination of an automobile motor having a throttle lever, a swinging operating lever extending through the floor of the automobile, the said throttle lever including a yoke, an operating shaft engaged with the said yoke and adapted to rotate when the operating lever is swung, a second shaft, a bracket mounted on the said motor for supporting the said shaft, means connecting the ends of the shaft to impart movement to one when the other is rotated, and means connecting the said shaft with the said throttle gear to exert a pull on the latter when the said shafts are rotated, and means for moving the said shaft to normal position and the lever to upright position when the pressure on the said lever is released.

3. In a knee throttle gear, the combination of an automobile motor having a throttle lever, a swinging operating lever extending through the floor of the automobile, the said throttle lever including a yoke, and operating shaft engaged with the said yoke and adapted to rotate when the operating lever is swung, a second shaft, a bracket mounted on the said motor for supporting the said shaft, means connecting the ends of the shaft to impart movement to one when the other is rotated, and means connecting the said shaft with the said throttle gear to exert a pull on the latter when the said shafts are rotated, and means for moving the said shaft to normal position and the lever to upright position when the pressure on the said lever is released, the said last mentioned means including an arm attached to the said bracket and projecting to one side thereof, and a tension spring connected to the said bracket, and to the said connecting means for the said lever.

4. A throttle gear comprising a bracket rigidly fixed to stationary position, bearings mounted on the bracket, a shaft having an operating lever connected thereto for rotating the said shaft when the operating lever is pressed, a second shaft, each of the said shafts having beveled gears in mesh for causing a rotation of both shafts, connecting rods joined to the said throttle lever, a link attached to the said connecting rods and to the said second shaft, the said bracket having an arm projecting therefrom, and a coil spring attached to the said arm and to the said link.

In testimony whereof I affix my signature in presence of two witnesses.

WILLIAM E. SEPPMAN.

Witnesses:
F. K. MEAGHER,
FLORENCE C. JOHNSON.